(12) United States Patent
Demars et al.

(10) Patent No.: US 12,603,468 B2
(45) Date of Patent: Apr. 14, 2026

(54) OPTICAL AMPLIFIER FAILURE PREDICTION USING MACHINE LEARNING

(71) Applicant: Ciena Corporation, Hanover, MD (US)

(72) Inventors: Carter Demars, Nepean (CA); Yinqing Pei, Kanata (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 976 days.

(21) Appl. No.: 17/838,687

(22) Filed: Jun. 13, 2022

(65) Prior Publication Data

US 2022/0329033 A1 Oct. 13, 2022

Related U.S. Application Data

(63) Continuation-in-part of application No. 16/746,117, filed on Jan. 17, 2020, now Pat. No. 11,411,365.

(51) Int. Cl.
| | |
|---|---|
| *H01S 3/00* | (2006.01) |
| *H01S 3/067* | (2006.01) |
| *H01S 3/0941* | (2006.01) |
| *H01S 3/10* | (2006.01) |
| *H04B 10/073* | (2013.01) |

(52) U.S. Cl.
CPC ........ *H01S 3/0014* (2013.01); *H01S 3/06754* (2013.01); *H01S 3/1001* (2019.08); *H04B 10/0731* (2013.01); *H01S 3/0941* (2013.01)

(58) Field of Classification Search
None
See application file for complete search history.

(56) References Cited

U.S. PATENT DOCUMENTS

| | | | |
|---|---|---|---|
| 5,374,973 A | 12/1994 | Maxham et al. | |
| 5,539,570 A | 7/1996 | Ushirozawa | |
| 5,822,094 A | 10/1998 | O'Sullivan et al. | |
| 6,064,501 A | 5/2000 | Roberts et al. | |
| 6,583,926 B1 * | 6/2003 | Wu .................... | H04B 10/2931 |
| | | | 372/38.07 |
| 8,509,618 B2 | 8/2013 | Boertjes et al. | |

(Continued)

FOREIGN PATENT DOCUMENTS

WO 2021146157 A1 7/2021

OTHER PUBLICATIONS

Yu et al. "Machine-learning based EDFA gain estimation [Invited]" Journal of Optical Communications and Networking vol. 13, issue 4, pp. B83-B91 (published Feb. 12, 2021) (Year: 2021).*

(Continued)

*Primary Examiner* — Eric L Bolda
(74) *Attorney, Agent, or Firm* — Baratta Law PLLC; Lawrence A. Baratta, Jr.

(57) ABSTRACT

Systems and methods for optical amplifier failure prediction using Machine Learning (ML), such as for an Erbium-Doped Fiber Amplifier (EDFA), are described. A method include obtaining a plurality of inputs from an optical amplifier associated with an optical network; analyzing the plurality of inputs with a trained machine learning model; obtaining an estimate of a total pump current of the optical amplifier as an output of the trained machine learning model; and comparing the estimate of a total pump current to a measured total pump current of the optical amplifier. The steps can include determining a health of the optical amplifier based on the comparing.

20 Claims, 14 Drawing Sheets

(56) References Cited

U.S. PATENT DOCUMENTS

| | | | |
|---|---|---|---|
| 8,666,247 | B2 | 3/2014 | Srinivasan et al. |
| 9,628,340 | B2 | 4/2017 | Blair et al. |
| 9,838,296 | B2 | 12/2017 | Armolavicius et al. |
| 10,171,161 | B1 | 1/2019 | Côté et al. |
| 10,491,501 | B2 | 11/2019 | Armolavicius et al. |
| 10,749,602 | B2 | 8/2020 | Charlton et al. |
| 11,126,929 | B2 | 9/2021 | Janulewicz et al. |
| 11,316,752 | B2 | 4/2022 | Côté et al. |
| 2008/0285016 | A1 | 11/2008 | Eiselt |
| 2009/0192735 | A1 | 7/2009 | Horiuchi et al. |
| 2018/0191432 | A1 | 7/2018 | Frankel et al. |
| 2018/0248905 | A1 | 8/2018 | Côté et al. |
| 2018/0343077 | A1 | 11/2018 | Al Sayeed et al. |
| 2019/0230046 | A1 | 7/2019 | Djukic et al. |
| 2019/0280942 | A1 | 9/2019 | Côté et al. |
| 2019/0379589 | A1 | 12/2019 | Ryan et al. |
| 2020/0067935 | A1 | 2/2020 | Carnes, III et al. |
| 2020/0082013 | A1 | 3/2020 | Triplet et al. |
| 2020/0259717 | A1 | 8/2020 | Ong et al. |
| 2020/0387797 | A1 | 12/2020 | Ryan et al. |
| 2021/0174246 | A1 | 6/2021 | Triplet |
| 2021/0303969 | A1 | 9/2021 | Amiri et al. |
| 2022/0416495 | A1* | 12/2022 | Neog ..................... H04B 10/27 |
| 2023/0085524 | A1* | 3/2023 | Neog ..................... G06N 3/045 |
| | | | 359/334 |
| 2023/0111693 | A1* | 4/2023 | Slovak ............... H04B 10/2916 |
| | | | 398/79 |

OTHER PUBLICATIONS

Zibar et al. "Inverse System Design Using Machine Learning: the Raman Amplifier Case", Journal of Lightwave Technology, vol. 38, issue 4, pp. 736-752 (Published Feb. 15, 2020) (Year: 2020).*

Christian Merkle, Degradation Model for Erbium-Doped Fiber Amplifiers to Reduce Network Downtime, 2010, p. 198-208, IFIP International Federation for Information Processing 2010.

* cited by examiner

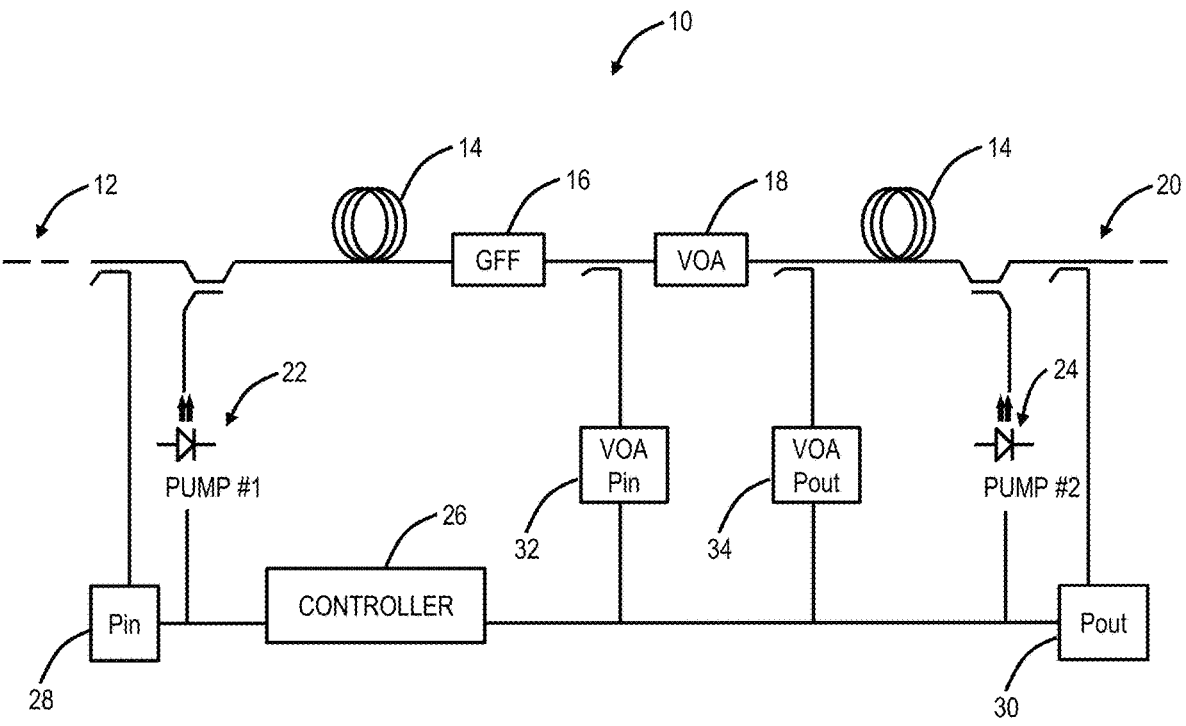
_FIG. 2_

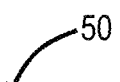

OBTAINING DATA FROM AN ERBIUM DOPED FIBER AMPLIFIER (EDFA) OPTICAL AMPLIFIER HAVING A PLURALITY OF PUMPS, WHEREIN THE DATA INCLUDES A REPRESENTATIVE OPTICAL POWER IN THE EDFA OPTICAL AMPLIFIER AND A PUMP METRIC REPRESENTATIVE OF A STATE OF THE PLURALITY OF PUMPS — 51

DETERMINING AN EFFICIENCY METRIC BASED ON THE REPRESENTATIVE OPTICAL POWER AND THE PUMP METRIC REPRESENTATIVE OF THE STATE OF THE PLURALITY OF PUMPS — 52

DETERMINING A DEGRADATION IN OPERATION OF THE EDFA OPTICAL AMPLIFIER BASED ON THE EFFICIENCY METRIC — 53

CAUSING ONE OR MORE ACTIONS BASED ON A DETERMINATION OF THE DEGRADATION — 54

*FIG. 6*

_FIG. 10_

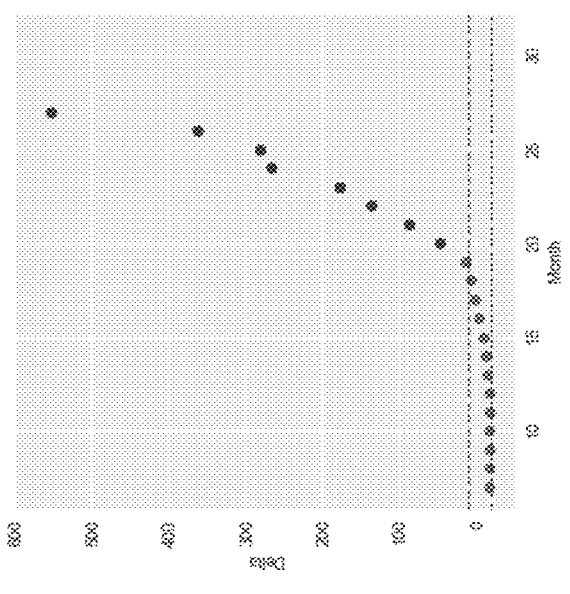
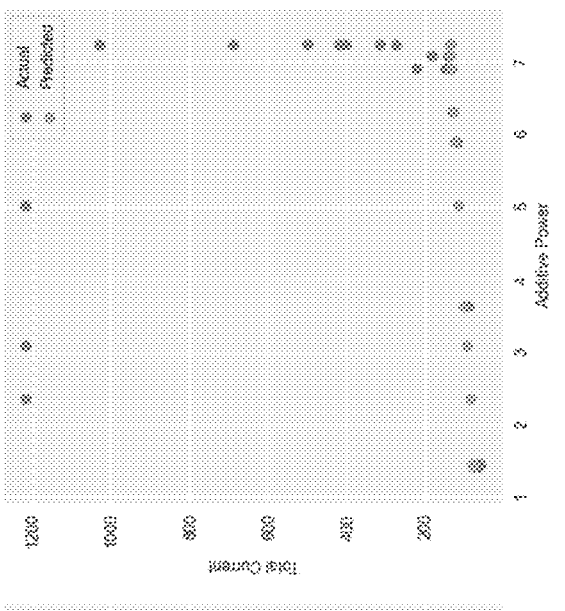
Failed EDFA Card, ANN Regression
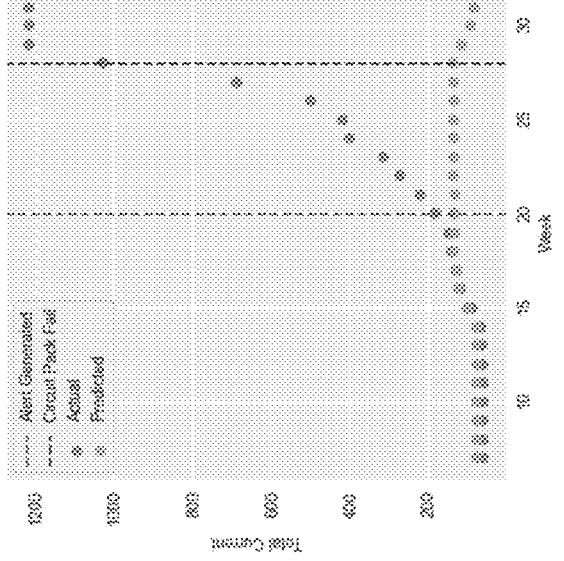
*FIG. 11*

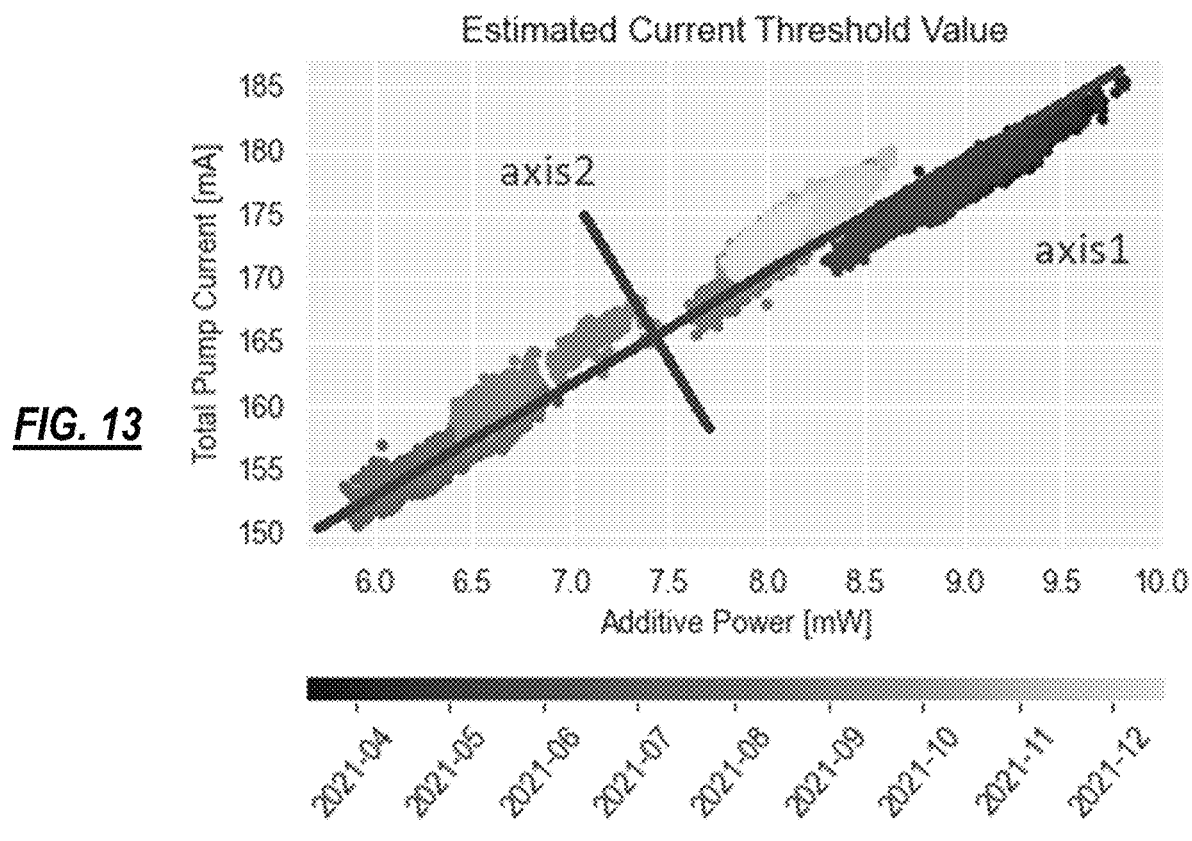
_FIG. 13_
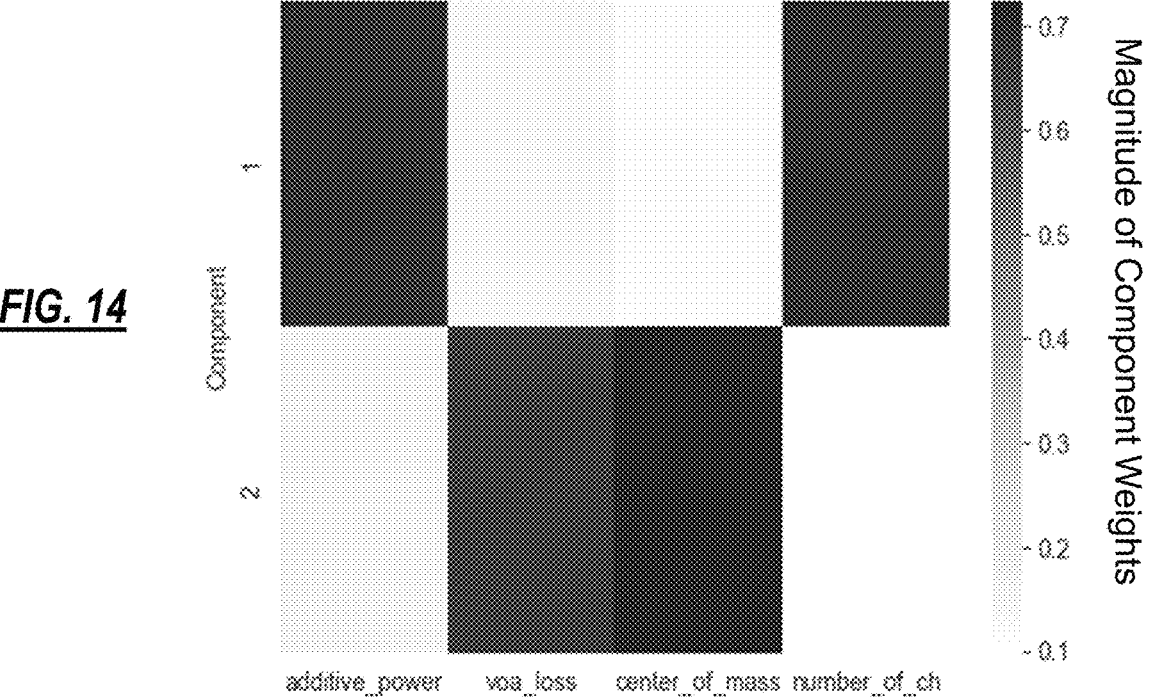
_FIG. 14_

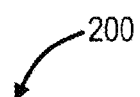

200

201

OBTAINING A PLURALITY OF INPUTS FROM AN OPTICAL AMPLIFIER ASSOCIATED WITH AN OPTICAL NETWORK

202

ANALYZING THE PLURALITY OF INPUTS WITH A TRAINED MACHINE LEARNING MODEL

203

OBTAINING AN ESTIMATE OF A TOTAL PUMP CURRENT OF THE OPTICAL AMPLIFIER AS AN OUTPUT OF THE TRAINED MACHINE LEARNING MODEL

204

COMPARING THE ESTIMATE OF A TOTAL PUMP CURRENT TO A MEASURED TOTAL PUMP CURRENT OF THE OPTICAL AMPLIFIER

*FIG. 15*

OPTICAL AMPLIFIER FAILURE PREDICTION USING MACHINE LEARNING

CROSS-REFERENCE TO RELATED APPLICATION(S)

The present disclosure is a continuation-in-part of U.S. patent application Ser. No. 16/746,117, filed Jan. 17, 2020, and entitled "System-level optical amplifier efficiency performance metric," the contents of which are incorporated by reference in their entirety.

FIELD OF THE DISCLOSURE

The present disclosure generally relates to optical amplifiers. More particularly, the present disclosure relates to systems and methods for optical amplifier failure prediction using Machine Learning (ML), such as for an Erbium-Doped Fiber Amplifier (EDFA).

BACKGROUND OF THE DISCLOSURE

Optical amplifiers are a key enabler for optical networks. Optical amplifiers amplify optical signals directly, without the need for conversion to an electrical signal. Examples of optical amplifiers include EDFAs, Raman amplifiers, and the like. Generally, optical amplifiers include multiple pump lasers which excite doped fiber, as is the case with EDFAs, or regular optical fiber, as is the case with Raman amplifiers. Optical amplifiers can support a range of wavelengths, such as the C-band (e.g., about 1530 nm to 1565 nm), the L-band (e.g., about 1565 nm to 1625 nm) with various optical channels, and the like. That is, an optical amplifier can support a significant amount of data traffic, such as hundreds of gigabits to multiple terabits. As such, it is critical to monitor the health of an in-service optical amplifier, such as for protection switching, for proactive maintenance, etc.

There has been significant work in developing metrics for monitoring optical amplifier health. For example, one technique includes the use of a laser pump current as a metric for indicating EDFA health. However, such approaches have significant limitations. First, optical amplifiers can include multiple pumps leading to problems in how to combine different pump currents into something meaningful. A further complication is that, for performance reasons, some selection of pumps may be run at much higher currents than others and the proportionality may change depending on the operating point of the amplifier. Also, the normal operating range of pump currents is very large. The pump currents are somewhat proportional to output power which can change over 10's of dBs (e.g., 1 channel to 96 channels can be 19 dB of change). Further pump currents depend on input power, output power, gain target, tilt settings, etc. Finally, the change in pump current may not be monotonic. One example of how this can happen is through the normal action of adding and deleting channels in an optical network to accommodate changing traffic demands. In terms of the EDFA, adding channels may increase pump current while deleting channels may decrease pump current. This makes the trend analysis difficult—what is normal change and what is indicative of precipitous failure? FIG. 1 is a graph illustrating the normal range of pump current. Because the normal range of pump current is so large, the changes in pump current due to amplifier degradation are indistinguishable from normal operation. Thus, the pump current does not serve well as a metric of EDFA health.

Another metric is whether an EDFA is able to achieve its specified maximum output power. However, in many system conditions, the amplifiers are not required to output the maximum power, so any internal degradation would not be evident using this metric. The EDFA may have degraded in noise figure and may, therefore, be compromising overall system performance which would go undetected, and even if it were detected, it would not be evident which EDFA in a cascade is the problematic one.

U.S. Pat. No. 5,822,094 to O'Sullivan et al., issued Oct. 13, 1998, and entitled "Self-stimulation signal detection in an optical transmission system," the contents of which are incorporated herein by reference, describes various techniques for monitoring optical amplifier performance utilizing dithering on signals and measuring the energy in transmitted and received dithers. This approach explicitly requires dithering.

U.S. Pat. No. 6,064,501 to Roberts et al., issued May 16, 2000, and entitled "Method of determining optical amplifier failures," the contents of which are incorporated herein by reference, describes various techniques for measuring a performance parameter of an optical amplifier. Specifically, Roberts et al. define a Figure of Merit (FOM) which is a health metric that can be monitored to indicate degradation of amplifier health. Deterioration is determined by a difference between a current FOM and a start of life FOM. The FOM is determined utilizing various measurements that are based on a pump back facet monitor, flowrates determined by Amplifier Stimulated Emission (ASE) power values, photon flowrates at specific wavelengths, etc. Drawbacks of this approach involve its complexity, expense such as in terms of the required measurement, external monitoring devices such as the pump back facet monitor, etc.

Merkle, Christian, "Degradation model for erbium-doped fiber amplifiers to reduce network downtime." *Meeting of the European Network of Universities and Companies in Information and Communication Engineering.* Springer, Berlin, Heidelberg, 2010, the contents of which are incorporated herein by reference, provides background and motivation related to the present disclosure. Merkle assumes a common misconception that pump current is constant for a constant gain, stating "[t]he basic concept of the algorithm is to calculate the pump diode current that would be needed to create the measured gain." This is only true for very controlled conditions, and not generally true for the wide range of conditions that amplifiers see in the field in real deployments. For example, Merkle further states "[d]ue to aging effects of the amplifier, the pump power of the amplifier has to be increased to obtain a constant gain." The assumption here is the only mechanism that would cause the pump current to need to be increased is that of aging. In a real system, i.e., one deployed and operating in the field under actual physical conditions and carrying traffic, the addition of more channels, changes in upstream loss, changes in control parameters, etc. all contribute to changes in pump current that have nothing to do with aging or impending failure.

Merkle further describes the "max pump current" being reached as an indicator of failure. This is only true in a single pump amplifier. In multi-pump designs, there are pump control algorithms that prefer to run some pumps very high, near or at their maximum current (power), in order to improve the noise performance of the amplifier.

As optical capacity increases, a single EDFA optical amplifier module can include multiple Terabits or more of capacity. As such, a single module failure can cause a significant loss of bandwidth. There is a need to provide a proactive metric that can be continually monitored to indicate health.

As noted above, metrics are one approach to determine amplifier operation and calibration. For example, a metric is used such as described herein to note the efficiency of the amplifier, and then a threshold is set beyond which the amplifier is considered failed or degraded. While useful for real-time detection, there is difficulty in accurately predicting amplifier failures and degradation in advance without false positives. This is in large part due to the operating conditions in the field which are very difficult to incorporate into a reasonable metric. These include, e.g., amplifier settings (gain, VOA loss, output power, gain tilt, etc.), operational conditions (spectral loading, input power, etc.). These factors make the choice of thresholds difficult, i.e., it is difficult to discern between changing operating conditions and actual degradation. For example, changing operating conditions, e.g., change in spectral loading, can create false positives, i.e., threshold crossings.

While it is, in principle, possible to create a complete enough physical model of a specific amplifier to overcome these limitations, it is typically impractical since these models require a complete knowledge of the EDFA itself including Erbium fiber characteristics such as emission and absorption cross sections, length, and the detailed characteristics of gain flattening filters and other passive components. These models therefore tend to be non-general, difficult to create, and do not apply easily to other types of amplifiers and sometimes even from unit to unit of the same design. Furthermore, the presence of non-homogeneous effects like spectral hole burning tend to make the models themselves less accurate than required when applied to field conditions with arbitrary spectral loading.

BRIEF SUMMARY OF THE DISCLOSURE

The present disclosure relates to systems and methods for optical amplifier failure prediction using Machine Learning (ML), such as for an Erbium-Doped Fiber Amplifier (EDFA). Specifically, the present disclosure utilizes trained ML models to predict optical amplifier failures. Advantageously, this approach is less prone to false positives and more accurate in identifying decreases in amplified performance. Proactively predicting the failure of optical devices in the field has long been desired to increase the availability and reliability of optical networks. The present disclosure monitors commonly available datapoints from EDFAs to accurately predict failing units.

In various embodiments, the present disclosure can be implemented as a method, as instructions stored in a non-transitory computer-readable medium, in an optical amplifier, or in any general processing device. In an embodiment, the steps for the method or the instructions include obtaining a plurality of inputs from an optical amplifier associated with an optical network; analyzing the plurality of inputs with a trained machine learning model; obtaining an estimate of a total pump current of the optical amplifier as an output of the trained machine learning model; and comparing the estimate of a total pump current to a measured total pump current of the optical amplifier. The steps can include determining a health of the optical amplifier based on the comparing. The plurality of inputs can include any of input power, output power, an optical power metric, a gain target, a tilt setting, a Variable Optical Attenuator (VOA) loss, a center of mass, a number of channels, an efficiency metric, and total threshold currents of all pumps. The plurality of inputs can include an optical power metric and a number of channels. The plurality of inputs include operating parameters that are measured in operation and configuration parameters that are either configured or based on hardware type. The trained machine learning model can include an adjustment factor based on a type of hardware for the optical amplifier. The plurality of inputs can include categorical features based on a type of hardware for the optical amplifier.

The trained machine learning model can be trained on historical data from one or more types of optical amplifiers, and wherein the plurality of inputs are from a different type of optical amplifier from the one or more types of optical amplifiers. The trained machine learning model can be a deep neural network having two layers. The two layers can include a multi-layer perceptron model and a rectified linear unit activation function at each node in the multi-layer perceptron model.

Also, the present disclosure relates to systems and methods for a system-level optical amplifier efficiency metric, such as for an Erbium-Doped Fiber Amplifier (EDFA). The efficiency metric is a single metric that summarizes optical amplifier behavior and has a predictable behavior over various different optical amplifier settings and operation conditions. Specifically, the efficiency metric is simple and elegant. The simplicity is based on the fact the efficiency metric is determined from available data in an optical amplifier, not requiring external monitoring equipment, dithering, etc. The elegance is based on the fact the efficiency metric covers different optical amplifier settings, operating conditions, multiple pumps, etc. and is shown to reflect degradation with these differences in real-world systems accurately. Specifically, the efficiency metric is designed to reflect health in a multiple pump optical amplifier, providing a single value that represents the total pump currents across all of the multiple pumps.

The present disclosure can be implemented as a method, as instructions stored in a non-transitory computer-readable medium, and in an optical amplifier. In an embodiment, the steps for the method or the instructions include obtaining data from an Erbium-Doped Fiber Amplifier (EDFA) optical amplifier having a plurality of pumps, wherein the data includes a representative optical power in the EDFA optical amplifier and a pump metric representative of a state of the plurality of pumps; determining an efficiency metric based on the representative optical power and the pump metric representative of the state of the plurality of pumps; determining a degradation in operation of the EDFA optical amplifier based on the efficiency metric; and causing one or more actions based on a determination of the degradation.

The steps can further include determining the degradation based on one of i) the efficiency metric reaching a threshold and ii) values of the efficiency metric over time having a negative trend. The one or more actions can include any of an alert via a Network Management System (NMS) for proactive maintenance, and a protection switch to another path in a network that does not include the EDFA optical amplifier. The data can include outputs of a plurality of power monitors and calibration data in memory on the EDFA optical amplifier. The representative optical power can be a linear combination of a selection of a plurality of total input power, total output power, signal output power, and signal input power, and the pump metric can be a linear combination of a selection of a plurality of pump optical powers, pump drive currents, back facet monitor powers, back facet monitor currents, pump monitor powers, and pump monitor currents.

In a first embodiment, the representative optical power is $P_{out}-P_{in}$ where $P_{out}$ can be the output power of the EDFA optical amplifier including Amplified Stimulated Emission (ASE) and $P_{in}$ is the input power to the EDFA optical amplifier including ASE, the pump metric can be $\Sigma_i(I_i-I_{th,i})$ where i is an integer the counts over all of the plurality of pumps, $I_t$ is the current of pump I, and $I_{th,i}$ is the threshold current of pump I, and the efficiency metric can equal to $$\frac{P_{out}-P_{in}}{\Sigma_i(I_i-I_{th,i})}.$$

In a second embodiment, the representative optical power can be $GP_{in}$ where G is the signal gain of the EDFA optical amplifier and $P_{in}$ is the input power to the EDFA optical amplifier including ASE, the pump metric can be $\Sigma_i(I_i-I_{th,i})$ where i is an integer the counts over all of the plurality of pumps, $I_i$ is the current of pump I, and $I_{th,i}$ is the threshold current of pump I, and the efficiency metric can be equal to $$\eta_{eff}=\frac{GP_{in}}{\Sigma_i(I_i-I_{th,i})}.$$

In a third embodiment, the representative optical power can be $GP_{in}$ where G is the signal gain of the EDFA optical amplifier and $P_{in}$ is the input power to the EDFA optical amplifier including ASE, the pump metric can be $\Sigma_i(P_i)$ where i is an integer the counts over all of the plurality of pumps, and $P_i$ is the optical power of pump i, and the efficiency metric can be equal to $$\eta_{eff}=\frac{GP_{in}}{\Sigma_i(P_i)}.$$

In a fourth embodiment, the representative optical power can utilize a transmission coefficient of a Variable Optical Attenuator (VOA) associated with the EDFA optical amplifier. In a fifth embodiment, the representative optical power can be $\int\delta(f)\rho_{EDFA}df$, where f is the frequency to be integrated over the full band of the EDFA optical amplifier, $\delta(f)$ is the normalization factor of efficiency as a function of frequency, and $\rho_{EDFA}$ is the power spectral density of a representative power metric in the EDFA optical amplifier.

In another embodiment, an Erbium-Doped Fiber Amplifier (EDFA) optical amplifier includes doped fiber; a plurality of pumps connected to the doped fiber; a plurality of power monitors; and a controller configured to obtain data from the plurality of pumps and the plurality of power monitors, wherein the data includes a representative optical power in the EDFA optical amplifier and a pump metric representative of a state of the plurality of pumps, determine an efficiency metric based on the representative optical power and the pump metric representative of the state of the plurality of pumps, determine a degradation in operation of the EDFA optical amplifier based on the efficiency metric, and cause one or more actions based on a determination of the degradation.

The controller can be further configured to determine the degradation based on one of i) the efficiency metric reaching a threshold and ii) values of the efficiency metric over time having a negative trend. The one or more actions can include any of an alert via a Network Management System (NMS) for proactive maintenance, and a protection switch to another path in a network that does not include the EDFA optical amplifier. The data can include calibration data in memory on the EDFA optical amplifier. The representative optical power can be a linear combination of a selection of a plurality of total input power, total output power, signal output power, and signal input power, and the pump metric can be a linear combination of a selection of a plurality of pump optical powers, pump drive currents, back facet monitor powers, back facet monitor currents, pump monitor powers, and pump monitor currents.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of an EDFA optical amplifier.

FIG. 6 is a flowchart of an EDFA optical amplifier health monitoring process.

FIG. 10 is graphs of example results of the ANN.

FIG. 11 is graphs of a known failed EDFA modeled with the ANN.

FIG. 13 is a graph of two example components in Principal Component Analysis.

FIG. 14 is a heatmap depicting the magnitude of the weights for each feature in the first two components in the Principal Component Analysis.

FIG. 15 is a flowchart of a machine learning process for failure prediction of optical amplifiers.

DETAILED DESCRIPTION OF THE DISCLOSURE

Figure 1:
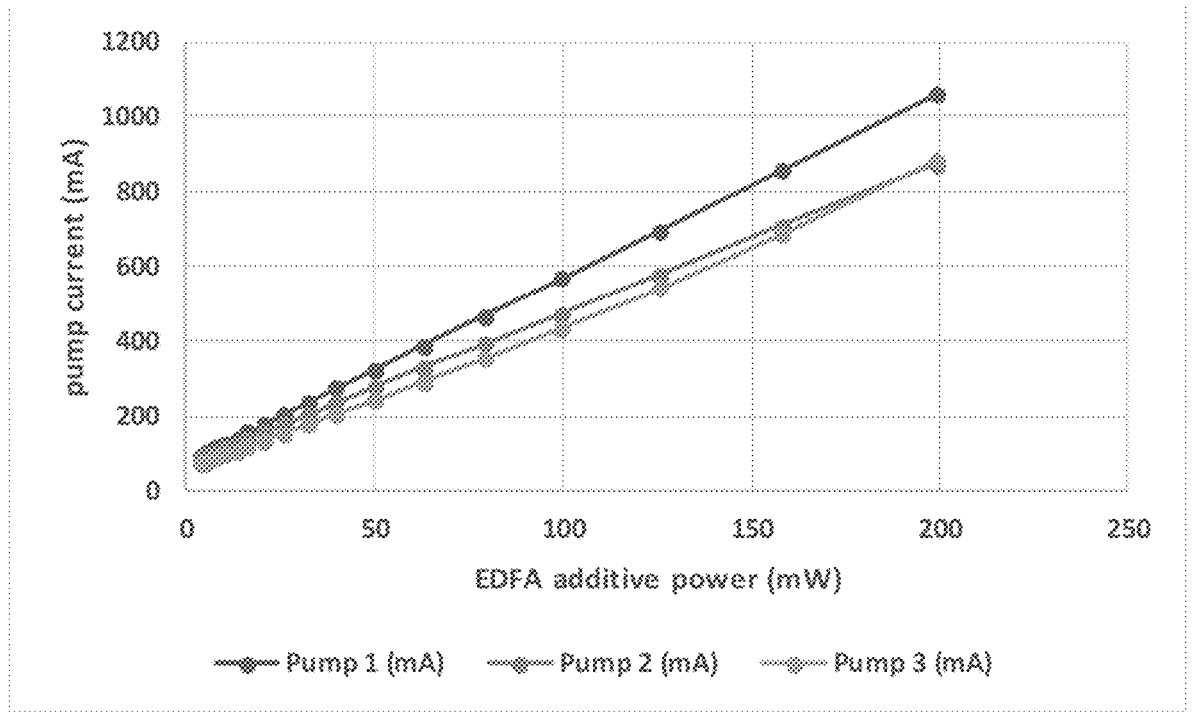
FIG. 1 is a graph illustrating the problem of pump current in an EDFA.

Again, the present disclosure relates to systems and methods for optical amplifier failure prediction using Machine Learning (ML), such as for an Erbium-Doped Fiber Amplifier (EDFA). Specifically, the present disclosure utilizes trained ML models to predict optical amplifier failures. Advantageously, this approach is less prone to false positives and more accurate in identifying decreases in amplified performance. Proactively predicting the failure of optical devices in the field has long been desired to increase the availability and reliability of optical networks. The present disclosure monitors commonly available datapoints from EDFAs to accurately predict failing units.

Efficiency Metric

Also, the present disclosure relates to systems and methods for a system-level optical amplifier efficiency metric, such as for an Erbium-Doped Fiber Amplifier (EDFA). The efficiency metric is a single metric that summarizes optical amplifier behavior and has a predictable behavior over various different optical amplifier settings and operating conditions. Specifically, the efficiency metric is simple and elegant. The simplicity is based on the fact the efficiency metric is determined from available data in an optical amplifier, not requiring external monitoring equipment, dithering, etc. The elegance is based on the fact the efficiency metric covers different optical amplifier settings, operating conditions, multiple pumps, etc. and is shown to reflect degradation with these differences in real-world systems accurately. Specifically, the efficiency metric is designed to reflect health in a multiple pump optical amplifier, providing a single value that represents the total pump currents across all of the multiple pumps.

The current trend is for optical network equipment to provide additional value to network operators. For example, operating the network at a low Signal-to-Noise Ratio (SNR) margin is seen as one of the ways to get more capacity or reach, and have an overall more cost-effective offering. As a result, proactive network health prediction is more important than ever. In the past, systems were operated with excess SNR margin for safety. As operators seek to exploit this excess margin, there is less margin for safety and thus a need to proactively monitor for system degradation. One example of utilizing excess SNR for more capacity or reach is described in U.S. Pat. No. 10,148,348 to Swinkels et al., issued Dec. 4, 2018, and entitled "Systems and methods to increase capacity in optical networks based on excess margin," the contents of which are incorporated herein by reference. Also, systems may also include protection (such as 1+1 or 1:1 protection in Synchronous Optical Network (SONET) or Optical Transport Network (OTN), redundant link capacity in Internet Protocol (IP)/Ethernet, etc.), at layers above the optical layer. If one can increase the optical layer availability (reliability) by predicting failures at the optical layer, one can reduce the amount of redundant capacity which results in a more cost-effective offering.

As part of such proactive monitoring, centralized control and analytics solutions such as Ciena Corporation's Blue Planet Analytics use constant monitoring and trending analysis to implement applications such as a Network Health Predictor aimed at this very goal. This disclosure provides a more meaningful metric, which can be used with this type of app for the prediction of the health of EDFAs than is available today. The goal of such a metric is to detect degradation of an optical amplifier in advance of any failures or impacts on live traffic. With advanced warning of degradations, it is possible to implement proactive maintenance, thereby increasing availability and reliability at the optical layer.

FIG. 2 is a block diagram of an EDFA optical amplifier 10. The optical amplifier 10 includes an input 12, doped fiber 14, a Gain Flattening Filter (GFF) 16, a Variable Optical Attenuator (VOA) 18, and an output 20. The optical amplifier 10 further includes multiple pumps 22, 24 that are configured to provide a pump laser to excite the doped fiber 14. For example, the doped fiber 14 can be doped with Erbium, and the pumps 22, 24 can be at or around 980 nm, 1480 nm, etc. The pumps 22, 24 have a pump laser current, $I_i$ is the current of pump i. The values of the pump laser current can be provided to a controller 26. The optical amplifier 10 also includes a power monitor 28 that detects input power, $P_{in}$, a power monitor 30 that detects output power, $P_{out}$, a power monitor 32 that detects input power to the VOA 18, VOA $P_{in}$, and a power monitor 34 that detects output power from the VOA 18, VOA $P_{out}$. Of note, the optical amplifier 10 includes various couplers and taps to connect the various components. Also, it should be appreciated by those of ordinary skill in the art that FIG. 2 depicts the optical amplifier 10 in an oversimplified manner, and a practical embodiment may include additional components and suitably configured processing logic to support known or conventional operating features that are not described in detail herein. For example, the optical amplifier 10 can include multiple stages of doped fiber 14, more pumps 22, 24, etc. Operationally, the optical amplifier 10 is configured to amplifier optical signals at the input 12 and provide the amplified optical signals at the output 20.

The controller 26 is a processing device and is communicatively coupled to various components in the optical amplifier 10 as well as configured to provide an output, such as to a Network Management System (NMS), Element Management System (EMS), Software Defined Networking (SDN) controller, analytics engine, etc. Generally, the controller 26 can include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, the controller is a hardware device, optionally with software, firmware, and a combination thereof, and can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The present disclosure allows for the simplification of the issues of existing solutions by summarizing the EDFA optical amplifier 10 behavior into a single metric that has a predictable behavior over many different settings of the EDFA optical amplifier 10.

The metric proposed is an effective pump efficiency, $\eta_{eff}$ calculated as follows:

$$\eta_{eff} = \frac{P_{EDFA}}{A_{pump}} \tag{1}$$

where $P_{EDFA}$ is a representative optical power in the EDFA optical amplifier 10, and $A_{pump}$ is a chosen metric representative of the state of the pumps 22, 24 in the EDFA optical amplifier 10.

This metric works well as a monitor of the health of the optical amplifier 10 as it is a generalization of the law of conservation of power. The generalization makes the metric simpler by allowing a relaxation of the normal all-inclusive nature of the law of conservation, and by allowing a mixture of inputs which may not have the same units. It allows the designer of the metric to choose the available measurements in the optical amplifier 10 while not worrying about the conversion factors, e.g., current in mA to power in mW, or minor contributors such as additive ASE which can be complex and expensive to measure. That is, the metric is based on available measurements in the optical amplifier 10, in their current units. There is no need for excess monitoring equipment or the need to perform complex measurements or calculations.

As a result, the EDFA optical power metric in the numerator of the expression can be any function, usually a linear combination, of a selection of total input power, total output power, signal output power, signal input power, etc. Those of ordinary skill in the art will appreciate these values are available from the power monitor 28 that detects input power, $P_{in}$, and the power monitor 30 that detects output power, $P_{out}$. That is, the power monitors 28, 30 are configured to provide both total power and individual signal power values. Also, those of ordinary skill in the art will appreciate practically all implementations of EDFA optical amplifiers 10 include these power monitors 28, 30.

The pump metric in the denominator of the expression can be any function, usually, a linear combination of a selection of pump optical powers, pump drive currents, back facet monitor powers, back facet monitor currents, pump monitor powers, pump monitor currents, etc. It should be noted that the metric thus attained may have different units in different embodiments. For the purposes of detecting degradation or trend analysis, this has no effect. Those of ordinary skill in the art will recognize the pumps 22, 24 can directly provide various readings to the controller 26, such as pump drive currents, etc.

First Embodiment—Efficiency Metric

In a first embodiment, the metrics $P_{EDFA}$ and $A_{pump}$ can be defined in terms of easily obtainable parameters of the EDFA optical amplifier 10, namely:

$$\eta_{eff} = \frac{P_{out} - P_{in}}{\Sigma_i (I_i - I_{th,i})} \tag{2}$$

where $P_{out}$ is the output power of the EDFA optical amplifier 10 (including ASE), $P_{in}$ is the input power to the EDFA optical amplifier 10 (including ASE), i is an integer the counts over all pumps in the EDFA optical amplifier 10, $I_i$ is the current of pump I, and $I_{th,i}$ is the threshold current of pump i.

The efficiency in this embodiment in equation (2) has units of mW/mA.

Advantageously, the various values used to determine the metric in equation (2) are readily available in the EDFA optical amplifier 10, without the need for additional monitoring equipment, dithering, etc. $P_{out}$ and $P_{in}$ are available from the power monitors 28, 30. The currents $I_i$ of pump i can be read by or provided to the controller 26 from the corresponding pumps 22, 24.

The threshold current, $I_{th,i}$, can be taken from the individual pump 22, 24 characteristics, the specifications for the pumps 22, 24, or can be measured empirically during the calibration and manufacturing process. It is also not necessary to determine the threshold currents individually in the case of empirical measurement since the sum in the denominator can be distributed across the two currents in the sum. By doing so, there is a single constant that represents the total threshold current across all pumps. Also, the characteristics, measurements, and/or specifications can be provided in local memory on the EDFA optical amplifier 10, such as in the controller 26, in memory, firmware, etc. As such, these values can be read by or are in the controller 26, for use in the equation (2) and other equations described herein.

Figure 3:
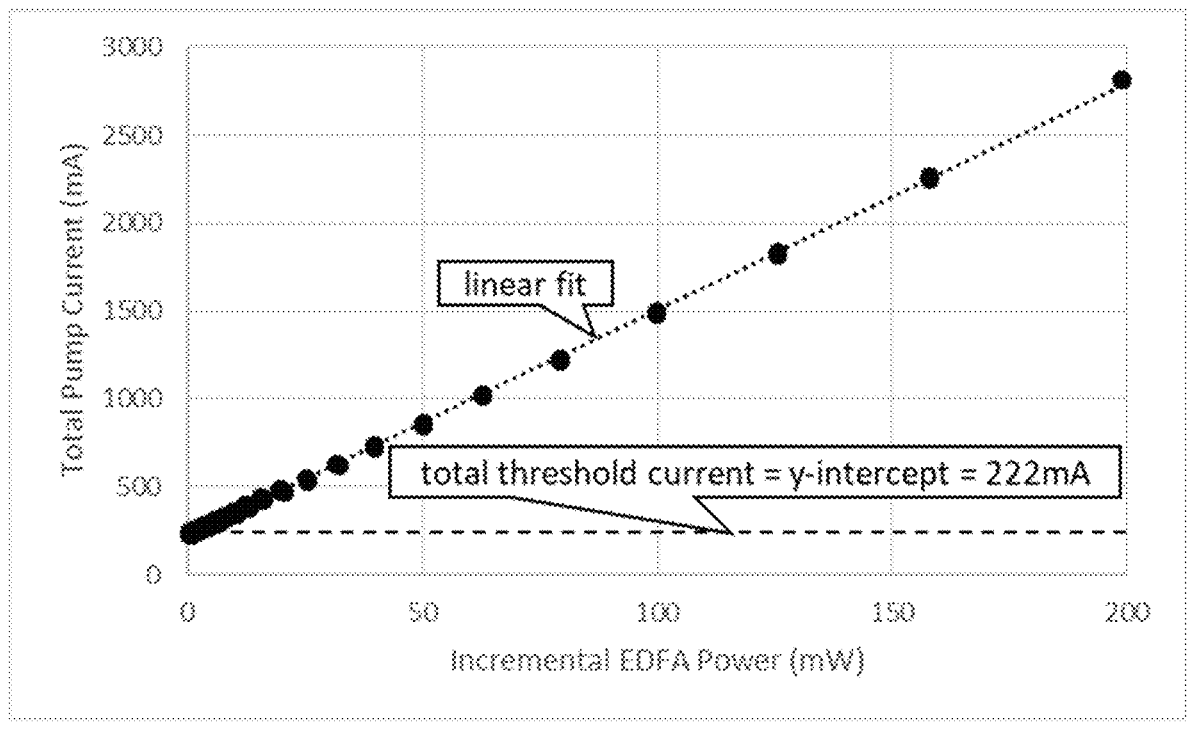
FIG. 3 is a graph describing one way to determine the total threshold current of an EDFA optical amplifier.

FIG. 3 illustrates one way to determine the total threshold current. In this approach, the optical amplifier 10 is controlled to a specific power setting, in this case, the additive EDFA power. For each power setting, the total pump current is measured. One can then plot a graph similar to FIG. 3 where the x-axis is the additive EDFA power and y-axis is the total pump current. A linear trend line can then be plotted through the data where the y-intercept of this line gives the total threshold current, which in this example would be 222 mA.

Figure 4:
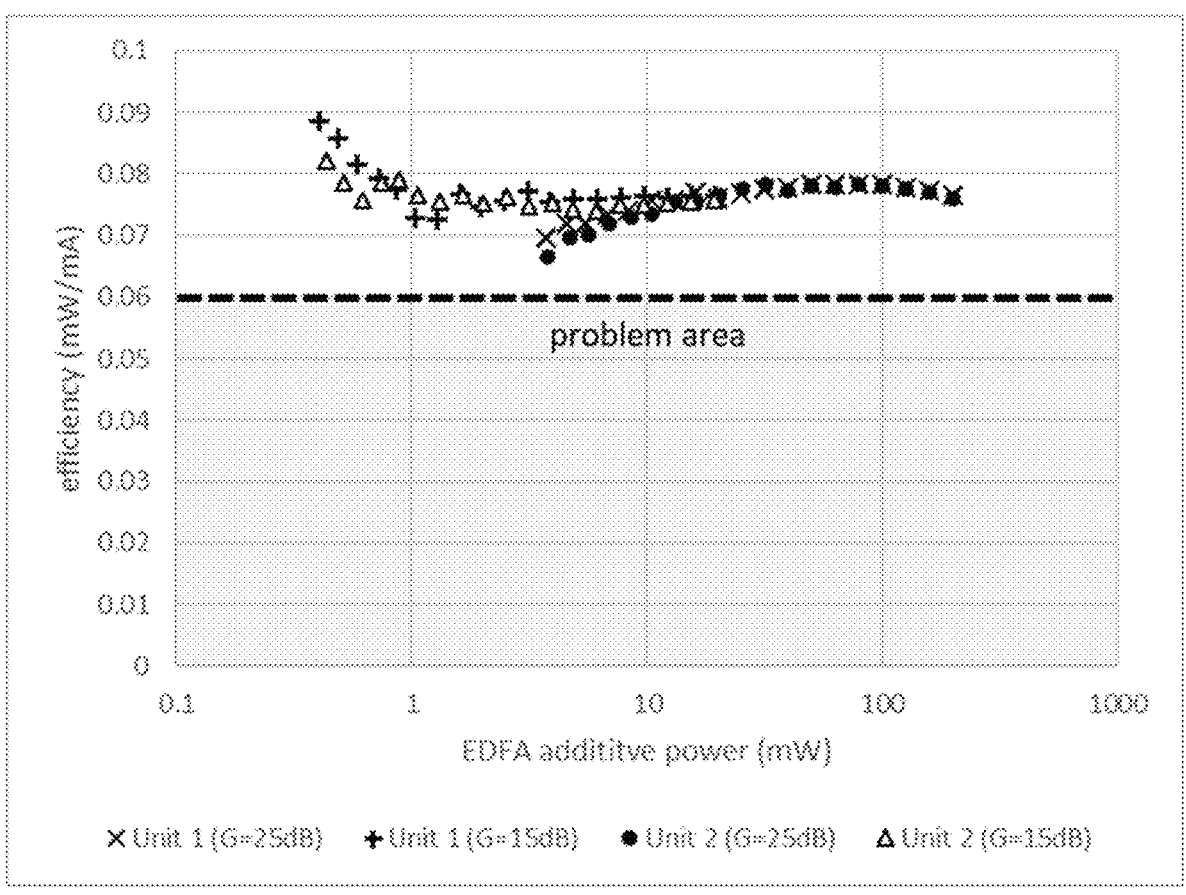
FIG. 4 is a graph of the metric from the first embodiment measured on different EDFA optical amplifiers.

FIG. 4 is a graph of the metric from the first embodiment measured on different EDFA optical amplifiers 10. The graph shows data points measured from 2 different constant gain controlled EDFA modules, Unit 1 and Unit 2. Each of these amplifiers is slightly more complex than the example optical amplifier 10 shown in FIG. 2, and has multiple Erbium doped fiber stages, a mid-stage VOA, gain flattening filter, and 3 pump lasers. The gain control in the module uses feedback from $P_{out}$ and $P_{in}$ available from the power monitors to calculate the Gain and adjusts the pumps accordingly to achieve the gain while minimizing the noise contribution of the module. Each module is operated at two different gain settings, 15 dB and 25 dB. The measurements of EDFA additive power and total pump current are taken over a range of input powers for each gain setting. From these, the efficiency metric from equation (2) is calculated and plotted against the EDFA additive power. This results in the four series of points shown in the graph. The left-most point in each series is the lowest operating power condition and the right-most point is the highest, each point in between being steps in optical power.

The result of this simple metric is a relatively constant efficiency metric which is independent of operation conditions and design details of the amplifier, e.g., number of pumps, number of doped fiber 14 stages, connectivity of the components, inclusion of GFF, VOAs, etc. These curves represent the normal operation of these amplifiers, such that if the efficiency were to drop it would be indicative of some issue internal to the module. Here, the metric (in mW/mA) indicates problems below 0.06.

Second Embodiment—Efficiency Metric

In another embodiment, the metrics $P_{EDFA}$ and $A_{pump}$ can be defined in terms of different parameters of the EDFA:

$$\eta_{eff} = \frac{GP_{in}}{\Sigma_i (I_i - I_{th,i})} \tag{3}$$

where G is the signal gain of the EDFA optical amplifier 10, $P_{in}$ is the input power to the EDFA optical amplifier 10 (including ASE), i is an integer the counts over all pumps in the EDFA optical amplifier 10, $I_i$ is the current of pump i, and $I_{th,i}$ is the threshold current of pump i.

The efficiency in equation (3) of this embodiment has units of mW/mA. The threshold currents can be in the same way as the previous embodiment.

Figure 5:
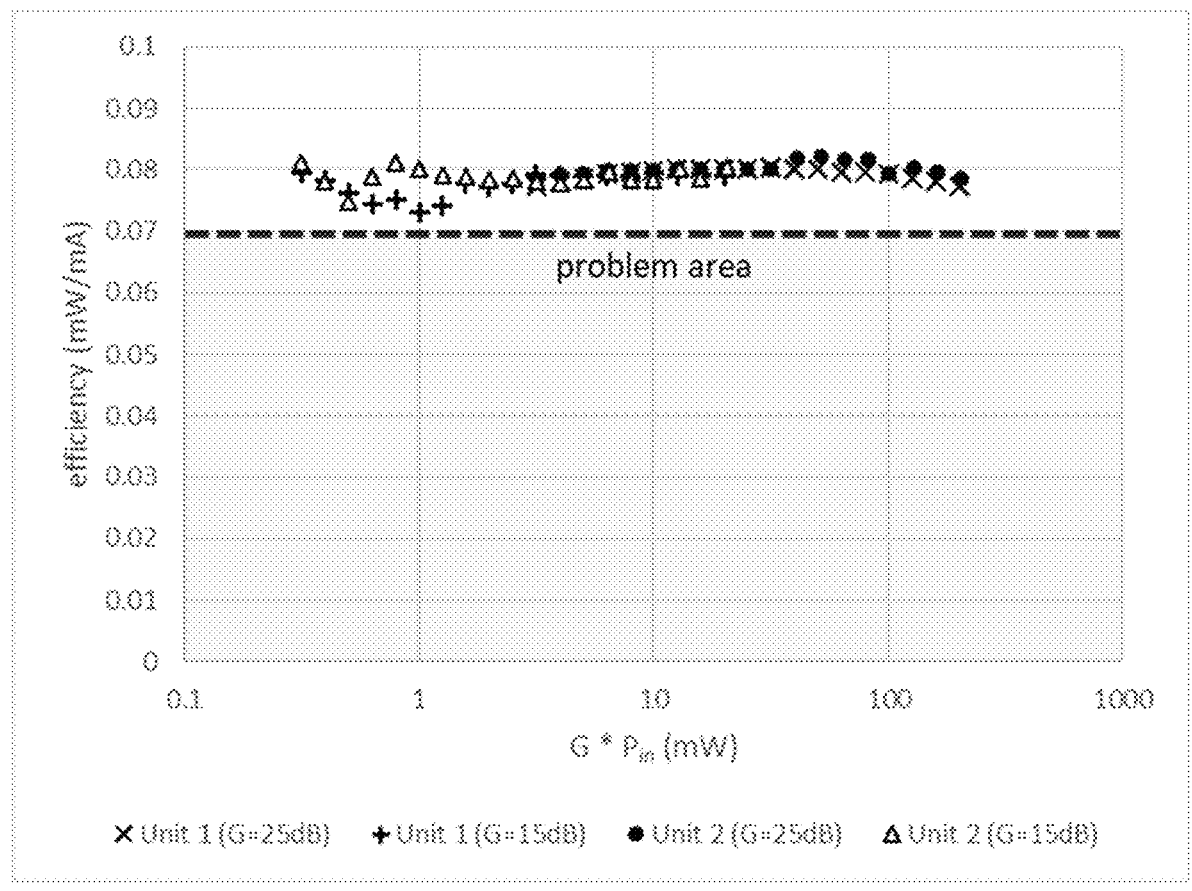
FIG. 5 is a graph of the metric from the second embodiment measured on different EDFA optical amplifiers.

FIG. 5 is a graph of the metric from the second embodiment measured on different EDFA optical amplifiers 10. The graph shows data points measured from 2 different constant gain controlled EDFA modules, Unit 1 and Unit 2. Each of these amplifiers is slightly more complex than the example shown in FIG. 2, and has multiple Erbium doped fiber stages, a mid-stage VOA, gain flattening filter, and 3 pump lasers. The gain control in the module uses feedback from $P_{out}$ and $P_{in}$ available from the power monitors to calculate the Gain and adjusts the pumps accordingly to achieve the gain while minimizing the noise contribution of the module. Each module is operated at two different gain settings, 15 dB and 25 dB. The measurements of $G*P_{in}$ and total pump current are taken over a range of input powers for each gain setting. From these, the efficiency metric from equation (3) is calculated and plotted against $G*P_{in}$. This results in the four series of points shown in the graph. The left-most point in each series is the lowest operating power condition and the right-most point is the highest, each point in between being steps in optical power.

The result of this simple metric is a relatively constant efficiency metric which is independent of operation conditions and design details of the amplifier. These curves represent the normal operation of these amplifiers, such that if the efficiency were to drop it would be indicative of some issue internal to the module. Here, the metric (in mW/mA) indicates problems below 0.07.

Third Embodiment—Efficiency Metric

In another embodiment, it is contemplated to use the optical power of the pumps directly either through calibrated monitor points, like back facet monitors or through knowledge of the L-I curves of the pumps themselves:

$$\eta_{eff} = \frac{GP_{in}}{\Sigma_i (P_i)} \tag{4}$$

where G is the signal gain of the EDFA optical amplifier 10, $P_{in}$ is the input power to the EDFA optical amplifier 10 (including ASE), i is an integer the counts over all pumps in the EDFA optical amplifier 10, $P_i$ is the optical power of pump i.

The efficiency in this embodiment is unitless (mW/mW).

Equation (4) works nicely for amplifiers 10 operating with a constant spectral loading over a wide range of input powers. This is the case for many systems that employ channel loading technologies, such as loading the band with ASE and then substituting noise power for channel power in a specific part of the spectrum using a Wavelength Selective Switch (WSS).

Fourth Embodiment—Efficiency Metric

More complex formulations are also contemplated to take into consideration other factors which can change the efficiency. One such modification can help take into consideration the additional internal loss of the VOA 18 used in most gain flattened EDFA optical amplifiers 10:

$$\eta_{eff} = \frac{T_{VOA} P_{EDFA}}{A_{pump}} \tag{5}$$

where $T_{VOA}$ is a function of the transmission coefficient of the VOA 18. The factor $T_{VOA}$ is not strictly the transmission coefficient of the VOA 18 but represents the change in the pump to additional power efficiency due to losing some fraction of the optical power in the mid-stage element. This factor can be simulated or measured empirically during the calibration of the amplifier 10.

Fifth Embodiment—Efficiency Metric

In the case that the efficiency of the amplifier 10 is a strong function of frequency and the spectral occupancy of the input signal is expected to change over time, one can change the efficiency calculation to include an integration of a normalization factor (or a weighted sum in the case of fixed channel systems) as follows:

$$\eta_{eff} = \frac{\int \delta(f)\rho_{EDFA}df}{A_{pump}} \tag{6}$$

where f is the frequency to be integrated over the full band of the EDFA optical amplifier 10, $\delta(f)$ is the normalization factor of efficiency as a function of frequency, and $\rho_{EDFA}$ is the power spectral density of the representative power metric in the EDFA optical amplifier 10.

Advantages—Efficiency Metric

The advantage of this metric over the usual pump current metric is the relatively constant value it maintains over several decades of change in the optical power of the EDFA optical amplifier 10. The effective efficiency represents the performance of the EDFA optical amplifier 10, therefore changes in the effective efficiency are distinct from normal changes in the operating conditions of the EDFA optical amplifier 10. The mechanisms that would cause the effective efficiency to be degraded include:

Additional loss internal to the EDFA optical amplifier 10 due to component aging or failure, Pump laser coupling efficiency degradation, e.g., misalignment, Pump laser aging causing a change in the threshold current, The mechanical strain on fiber or other optical components due to aging or damage or thermal cycling, etc., Package compromised by water or other contaminants and the like.

These effects compromise the EDFA optical amplifier's 10 ability to achieve its specified output power or noise performance or both.

EDFA Optical Amplifier Health Monitoring Process—Efficiency Metric

FIG. 6 is a flowchart of an EDFA optical amplifier health monitoring process 50. The process 50 can be implemented as a method, implemented in the controller 26 of the EDFA optical amplifier 10, or embodied as instructions stored in a non-transitory computer-readable medium. The process 50 includes obtaining data from an Erbium-Doped Fiber Amplifier (EDFA) optical amplifier having a plurality of pumps, wherein the data includes a representative optical power in the EDFA optical amplifier and a pump metric representative of a state of the plurality of pumps (step 51); determining an efficiency metric based on the representative optical power and the pump metric representative of the state of the plurality of pumps (step 52); determining a degradation in operation of the EDFA optical amplifier based on the efficiency metric (step 53); and causing one or more actions based on a determination of the degradation (step 54).

The process 50 can further include determining the degradation based on one of i) the efficiency metric reaching a threshold and ii) values of the efficiency metric over time having a negative trend. One approach to detect the degradation is to set a threshold for operation. If the effective efficiency drops below a specified threshold value, the optical amplifier is operating in a regime indicative of failure. The severity of this prediction can be judged on other parameters, such as whether the amplifier is able to achieve its output power target or whether it is generating additional noise. A second, less restrictive, approach would be to gather the statistic over time and perform a trending analysis on it. Any significant downward trend in the effective efficiency would be indicative of a potential failure.

The one or more actions can include any of an alert via a Network Management System (NMS) for proactive maintenance, and a protection switch to another path in a network that does not include the EDFA optical amplifier. For example, the proactive maintenance may include replacing the EDFA optical amplifier, such as during a maintenance window.

The data can include outputs of a plurality of power monitors and calibration data in memory on the EDFA optical amplifier. The representative optical power can be a linear combination of a selection of a plurality of total input power, total output power, signal output power, and signal input power, and the pump metric can be a linear combination of a selection of a plurality of pump optical powers, pump drive currents, back facet monitor powers, back facet monitor currents, pump monitor powers, and pump monitor currents.

The representative optical power can be $P_{out}-P_{in}$ where $P_{out}$ is the output power of the EDFA optical amplifier including Amplified Stimulated Emission (ASE) and $P_{in}$ is the input power to the EDFA optical amplifier including ASE, wherein the pump metric can be $\Sigma_i(I_i-I_{th,i})$ where i is an integer the counts over all of the plurality of pumps, $I_i$ is the current of pump I, and $I_{th,i}$ is the threshold current of pump I, and wherein the efficiency metric can be equal to $$\frac{P_{out}-P_{in}}{\Sigma_i(I_i-I_{th,i})}.$$

The representative optical power can be $GP_{in}$ where G is the signal gain of the EDFA optical amplifier and $P_{in}$ is the input power to the EDFA optical amplifier including ASE, wherein the pump metric can be $\Sigma_i(I_i-I_{th,i})$ where i is an integer the counts over all of the plurality of pumps, $I_i$ is the current of pump I, and $I_{th,i}$ is the threshold current of pump I, and wherein the efficiency metric can be equal to $$\eta_{eff}=\frac{GP_{in}}{\Sigma_i(I_i-I_{th,i})}.$$

The representative optical power can be $GP_{in}$ where G is the signal gain of the EDFA optical amplifier and $P_{in}$ is the input power to the EDFA optical amplifier including ASE, wherein the pump metric can be $\Sigma_i(P_i)$ where i is an integer the counts over all of the plurality of pumps, and $P_i$ is the optical power of pump i, and wherein the efficiency metric can be equal to $$\eta_{eff}=\frac{GP_{in}}{\Sigma_i(P_i)}.$$

The representative optical power can utilize a transmission coefficient of a Variable Optical Attenuator (VOA) associated with the EDFA optical amplifier. The representative optical power can be $\int\delta(f)\rho_{EDFA}df$, where f is the frequency to be integrated over the full band of the EDFA optical amplifier, $\delta(f)$ is the normalization factor of efficiency as a function of frequency, and $\rho_{EDFA}$ is the power spectral density of a representative power metric in the EDFA optical amplifier.

In another embodiment, an Erbium-Doped Fiber Amplifier (EDFA) optical amplifier includes doped fiber; a plurality of pumps connected to the doped fiber a plurality of power monitors; and a controller configured to obtain data from the plurality of pumps and the plurality of power monitors, wherein the data includes a representative optical power in the EDFA optical amplifier and a pump metric representative of a state of the plurality of pumps, determine an efficiency metric based on the representative optical power and the pump metric representative of the state of the plurality of pumps, determine a degradation in operation of the EDFA optical amplifier based on the efficiency metric, and cause one or more actions based on a determination of the degradation.

Network Monitoring and Analytics—Efficiency Metric

The metrics described herein can be displayed such as via a User Interface (UI), such as via an NMS, EMS, SDN controller, etc. Such a UI may include current metrics, historical metrics, trends, etc. Further, the present disclosure can include charts displaying the metrics, historical metrics, trends, etc. for one or more optical amplifiers 10, as well as for an entire network population of optical amplifiers 10. Also, there can be alarms and/or warnings based on the metrics, and these can also be displayed, streaming, alerted, etc.

In addition to various UI displays for the metrics, the metrics can be stored and maintained over time for individual optical amplifiers 10, for different types of optical amplifiers 10, for entire population of optical amplifiers 10. These historical metrics can be used for deriving analytics related to ongoing operation and performance of the optical amplifiers 10. The present disclosure also contemplates use of data analytics and machine learning with the metrics to determine trends and predictions. Such analytics can provide valuable insights into the operation of the optical amplifiers 10, such as which designs are more reliable, etc.

Overall Network Reliability—Efficiency Metric

As mentioned herein, multi-layer networks such as packet-optical networks include redundancy to support high availability. The redundancy generally includes excess capacity at the various layers (Layer 1—Time Division Multiplexing (TDM), Layers 2 or 3—packet, etc.). The excess capacity is generally reserved or preemptible. As such, this excess capacity is not exploited. Multi-layer networks all operate over an optical layer. With reliable data at the optical layer using the metrics described herein, it is possible to perform proactive maintenance in the optical layer, e.g., replacing optical amplifiers 10 before there are failures causing traffic impact. This generally increases the overall reliability of the optical layer. With an increase in the overall reliability of the optical layer, the multi-layer networks can be configured with less redundant capacity in the higher layers.

Example Metric Threshold Crossing

Figure 7:
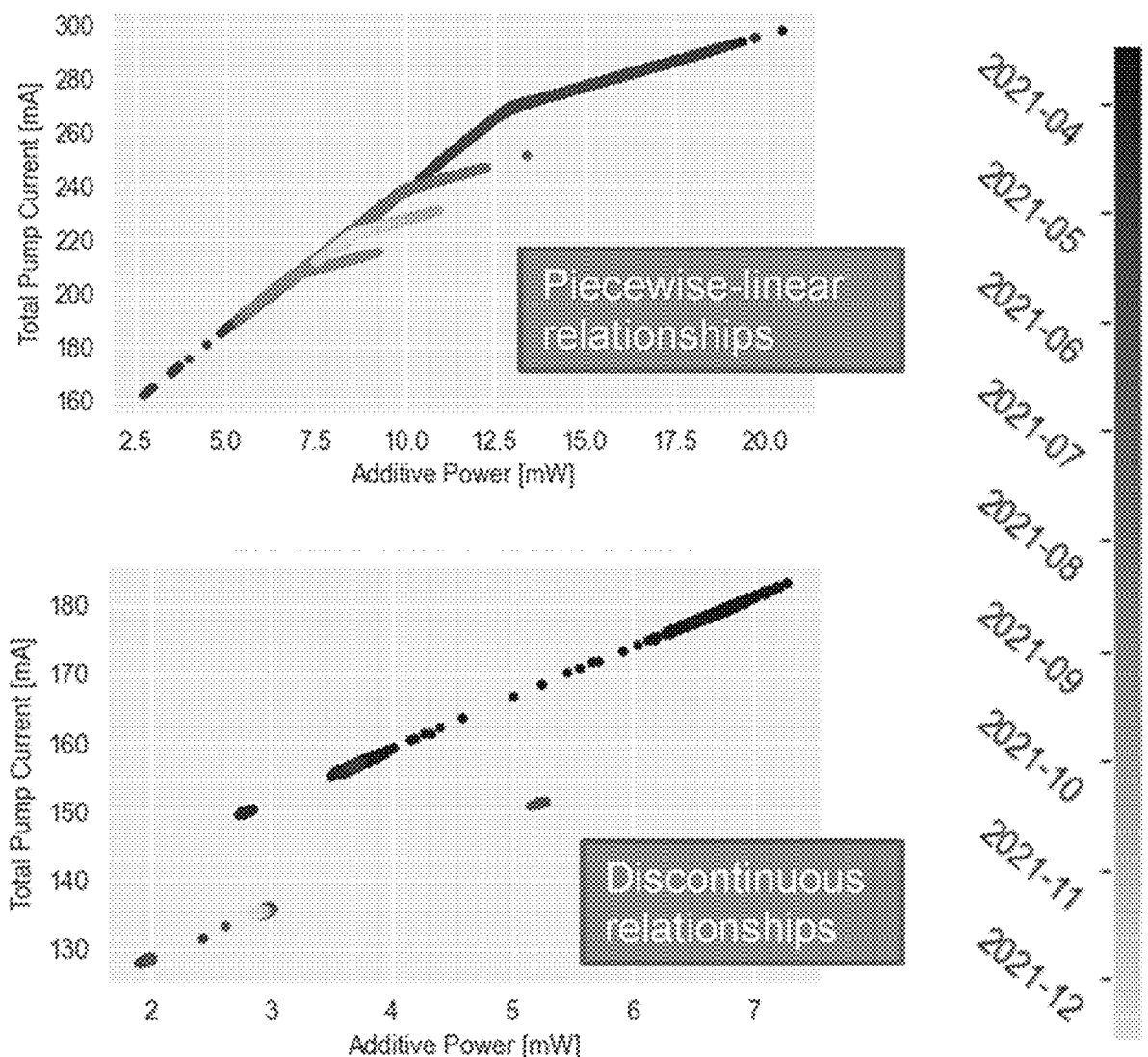
FIG. 7 is two graphs of total pump current versus additive power over time illustrating difficulties in selecting proper thresholds for any amplifier metric.

FIG. 7 is two graphs of total pump current versus additive power over time illustrating difficulties in selecting proper thresholds for any amplifier metric. The graphs in FIG. 7 are based on real field data and the shading of the values represents values at different times. As networks are dynamic, i.e., spectral loading can vary based on channels added/removed over time, it is difficult to discern the difference between changing conditions and actual degradation with a threshold crossing. This approach assumes that all EDFA devices have a continuous, univariate linear relationship between the optical power metric and pump current.

To perform trend analysis, a model must be capable of accurately characterizing "normal" amplifier performance. We observed that changes in VOA loss and spectral occupancy corresponds with changes in total pump current, and the relationship between the optical power metric and the pump current was likely not univariate. Therefore, a more robust model was required to accurately to represent EDFA behavior for the purposes of anomaly detection. There is not an analytical model that is readily available to describe the relationship between VOA loss, spectral occupancy, and pump current, so we needed to develop a data-driven model to represent the system.

Machine Learning

In an embodiment, the present disclosure uses an Artificial Neural Network (ANN) to detect potential failures of EDFA units in the field. The data used to train the ANN can be gathered over a period of years from a network in operation in the field. Regression by deep neural network can better characterize EDFA amplifier performance than other, less robust models. With a more accurate representation of the data (i.e., a regression model with lower mean error metrics), anomaly detection can better discern between actual degradation and changes in operating condition.

The artificial neural network approach is advantageous as follows

ANNs are well suited to regression with a continuous target variable such as pump current.

They are multivariate.

They can detect subtle, non-linear relationships between input variables.

They can generalize well to different types of EDFA hardware when trained with sufficient data.

They are Universal Approximators.

ANNs do not require input assumptions regarding the relationships between the variables.

Machine Learning Model

Figure 8:
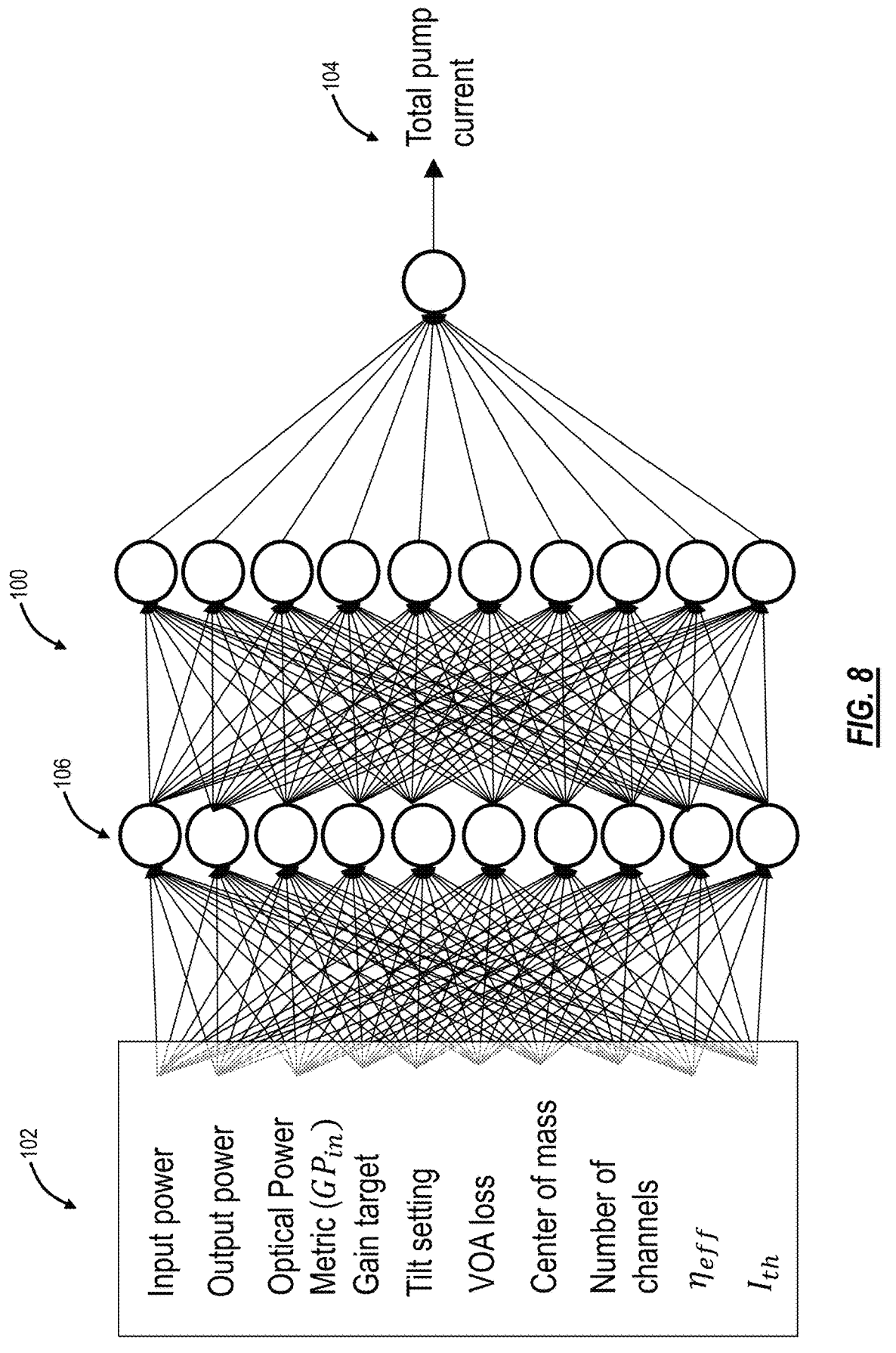
FIG. 8 is a logical diagram of a machine learning model (ANN) including various inputs and an output which is a prediction of total pump current.

FIG. 8 is a logical diagram of a machine learning model 100 (ANN 100) including various inputs 102 and an output 104 which is a prediction of total pump current. The inputs 102 can include measured and derived values, such as, for example, input power, output power, an output power metric ($GP_{in}$), a gain target, a tilt setting, VOA loss, center of mass, number of channels, $\eta_{eff}$, $I_{th,i}$, and the like. The input $\eta_{eff}$ is as described herein with respect to the efficiency metric. The input $I_{th,i}$ is the total threshold currents of all pumps in the EDFA design, if known. Default values for $I_{th,i}$ can be used when they are not known without a great loss of accuracy. The approach here is to use the machine learning model 100 which is an ANN to predict the total pump current of a good amplifier. This can then be compared to the measured total pump current directly to determine the relative health of the amplifier.

An additional benefit of this approach is the ability to analyze new EDFA devices on which the model has not been trained. With the previous metrics, we relied on watching trends in the efficiency metric over time, and this required a history of data for each specific EDFA device (or we used a threshold for this metric that was non-specific to new EDFAs). Using the model 100, we can analyze the performance of an EDFA with only a few datapoints, within a reasonable accuracy, because the model 100 can be generalized.

An additional set of inputs 102 to the ANN 100 could be categorical features that represent the type of EDFA device. This would help the ANN 100 generalize between different types of EDFA hardware. One example may be changing the number of pumps. Other examples could be parameters of the design itself, such as gain range, tilt range, output power range, frequency range (e.g., C-band, L-band, S-band, etc.), and the like. Other data could also be used to differentiate the amplifiers, and to help the ANN 100 to apply factors to compensate spectral loading inputs with less training such as fiber emission coefficient, fiber absorption coefficient, etc.

ANN

Accuracy matters, namely we want to characterize "normal" amplifier efficiency to a high degree of accuracy without overfitting. Also, there is enough historical data to train a robust neural network. With an ANN, unlike linear regression, we do not have to make assumptions about the nature of the relationship or the complexity of the model. The Universal Approximation Theorem, Cybenko, G. (1989) "Approximation by superpositions of a sigmoidal function," Mathematics of Control, Signals, and Systems, states a neural network with one hidden layer can represent any bounded and continuous function to an arbitrary accuracy, ε.

For us to accurately identify future trends, the underlying model 100 must be an accurate representation of historical performance. The model becomes more accurate with time, as more data becomes available to use for training. The model 100 uses an activation function (Rectified Linear Unit) at each node 106, which adds non-linearity. Neural networks are universal approximators. Given any function of real numbers (nonconstant, bounded, and continuous), and given some allowed threshold, you can construct a NN which approximates this function within the allowed threshold.

For the inputs 102, the idea is to provide the ANN 100 with input power, output power, gain target, tilt setting, as well as the number of channels and center of mass/frequency and the output 104 is predicted total pump current. We can then compare the predicted pump current against the actual current to determine whether the EDFA is performing as expected.

In an embodiment, the ANN 100 used in this application was a deep neural network with two layers. The caveat with the universal approximation theorem is that while a single-layered neural network can approximate any function, the layer may be infeasibly large and may fail to learn/generalize correctly. Adding depth to the network helps avoid the case of infeasibly large width.

Figure 9:
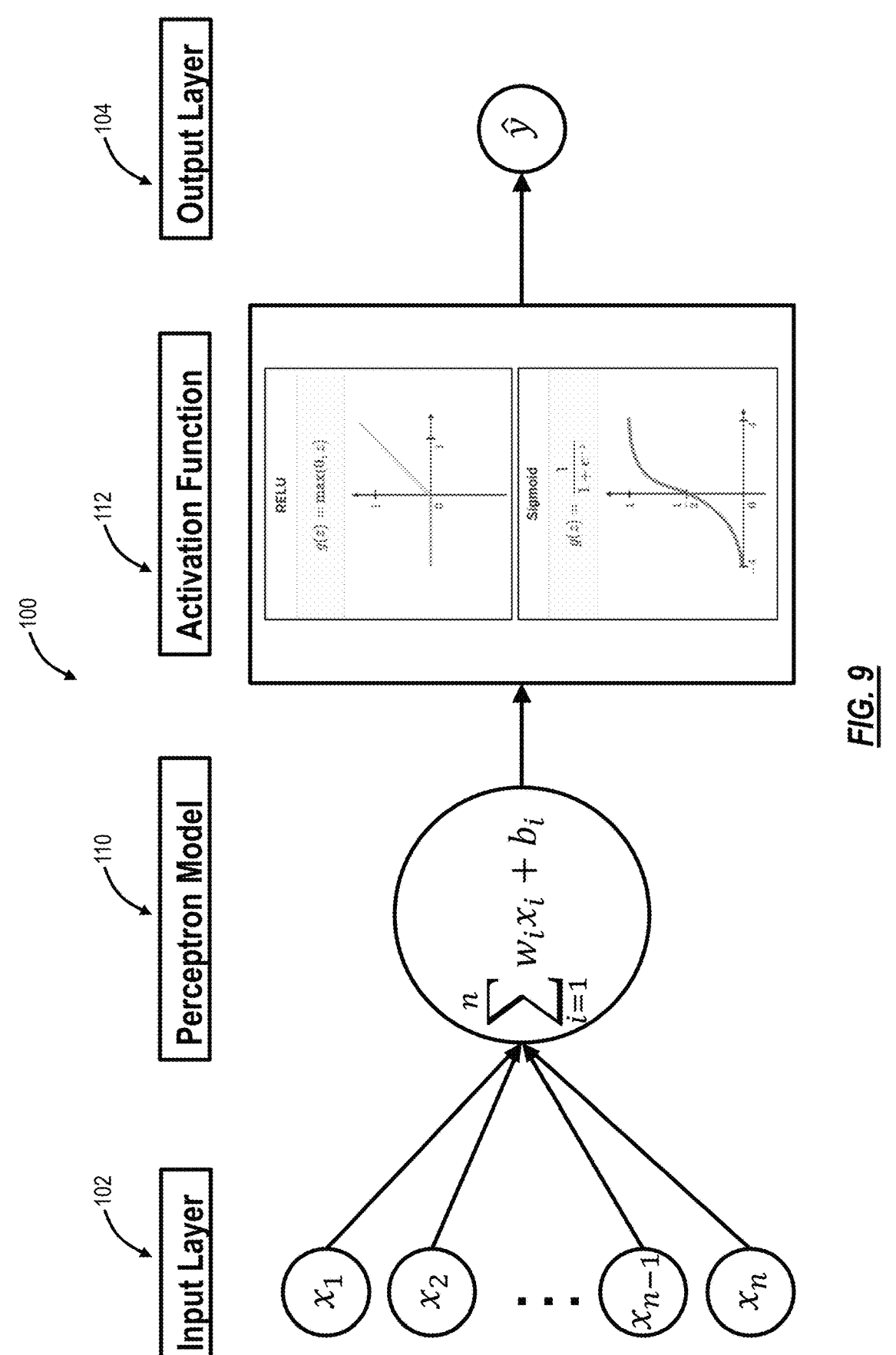
FIG. 9 is a logical diagram of the ANN illustrating a perceptron model and an activation function.

FIG. 9 is a logical diagram of the ANN 100 illustrating a perceptron model 110 and an activation function 112. The perceptron model 110 is a binary classifier that is a function which can decide whether or not an input, represented by a vector of numbers, belongs to some specific class. It is a type of linear classifier, i.e., a classification algorithm that makes its predictions based on a linear predictor function combining a set of weights with the feature vector.

How can adding together linear combinations yield something non-linear? The set of all linear combinations is closed under addition. Before the output is passed from the perceptron model 110, it is mapped onto an activation function 112. In binary classification problems, the sigmoid function is commonly used as a proxy for probability. In regression problems, a common activation function is the rectified linear unit (ReLu).

In an embodiment, ReLu is used for the activation function 112. To achieve optimal weights, the ANN 100 uses stochastic gradient descent. The derivative of the activation function 112 is required when updating the weights of a node 106 as part of the backpropagation of error (gradient of cost function requires chain rule). ReLu is computationally efficient, and during backpropagation the derivatives of the activation functions 112 are calculated, and for ReLu the derivative is either 0 or 1, which again is efficient to compute. There are other variations such as leaky ReLu, but for the purposes of this application, the Rectified Linear Unit was sufficient.

Results

Figure 10:
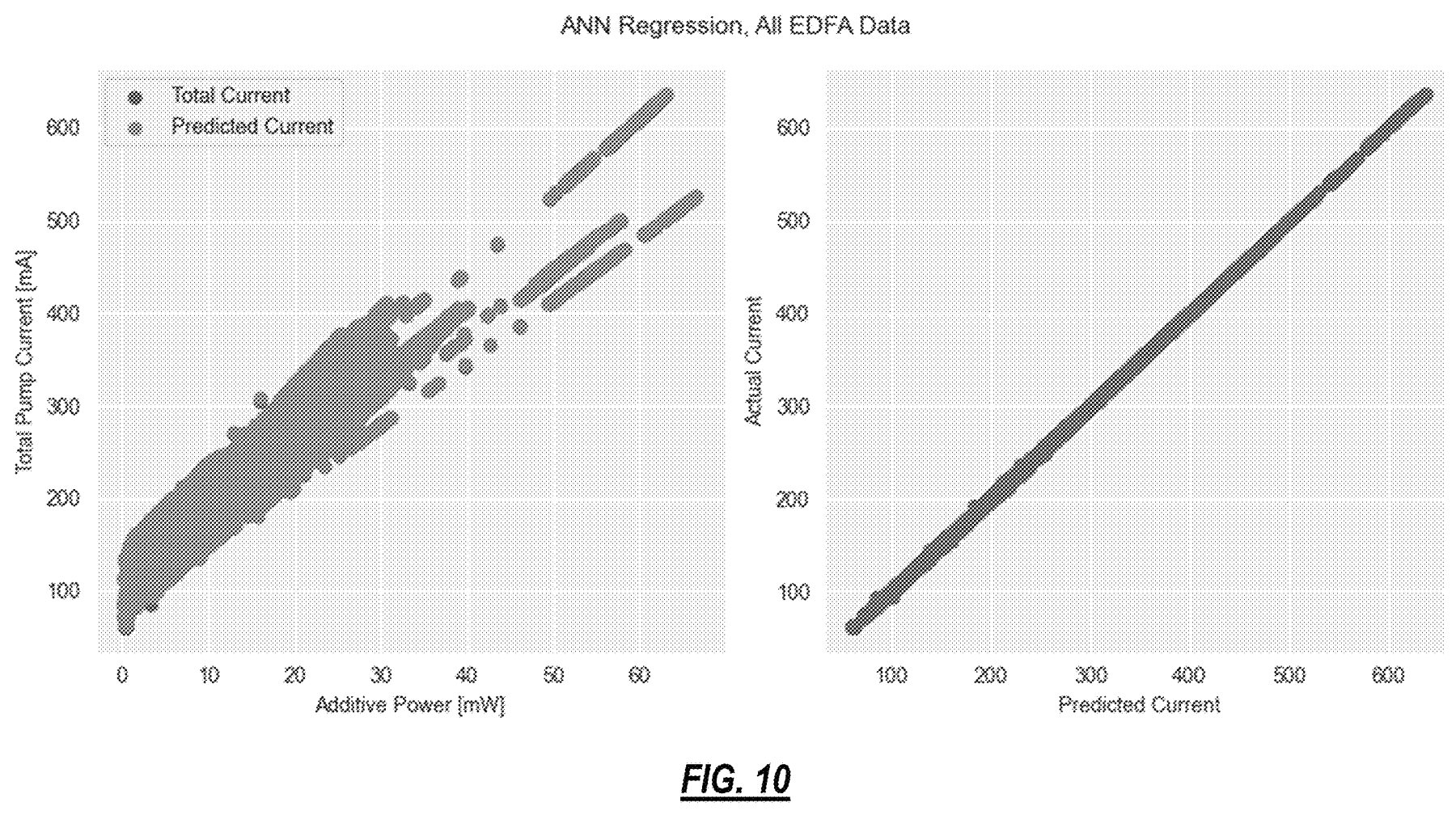

FIG. 10 is graphs of example results of the ANN 100. Statistics include:

| | |
|---|---|
| Explained Variance Regression Score | 0.99996 |
| Root Mean Square (RMS) Deviation | 0.455 mA |
| Mean Absolute Error (MAE) | 0.326 mA |

The explained variance regression score is 1−var(y−y_fit)/var(y). RMSE is sqrt(mean of (y−y_fit)^2). MAE is mean(y−y_fit). Even when you perform a multivariate linear regression using the same features using data from a single EDFA line, the ANN model (trained on all data and not necessarily fit to that line) is often more accurate.

Improvements

Factors that improved the accuracy of the artificial neural network model 100 include:

Tuning hyperparameters (batch size, epochs, units, layers, callbacks, learning rate, activation function, optimizer).

Adding features that enable the model to differentiate between EDFA lines (index, slope, threshold). As described herein, EDFA lines mean different hardware devices in terms of design, e.g., number of pumps, internal configuration, etc.

Adding additional features to account for unexplained variance (number of channels, frequency).

Tuning Hyperparameters

The purpose of hyperparameter tuning is to determine the optimal set of hyperparameters to train our model 100 that result in the highest accuracy (or lowest error) without overfitting. This is a tradeoff between accuracy and complexity. Example techniques to avoid overfitting the ANN 100 include adding dropout layers, callbacks/early stopping and adjusting the learning rate.

Generalization

A universally-trained artificial neural network 100 can estimate the total pump current of an EDFA line using only a few data points. The linear regression method requires months of historical data for each EDFA to accurately determine the unique slope and threshold value for each line. The ANN 100, on the other hand, estimates pump current for an amplifier based on patterns it has encountered in the training dataset, regardless of whether that particular EDFA was present in the training data.

To show this, we withheld 25% of the EDFAs from the training data, and used them to evaluate the ANN model, the results are similar to those generated based on the random train-test split.

| | |
|---|---|
| Explained Variance Regression Score | 0.998 |
| Mean Absolute Error | 1.54 mA |

Recall that $f_{eff}$ and $I_{th}$ can be passed as unique identifiers to help the model differentiate between different EDFA lines. When the model encounters a new EDFA line that it has not been trained on, the idea is that $\eta_{eff}$ and $I_{th}$ are sufficient to give it a good starting point for its estimations.

FIG. 11 is graphs of a known failed EDFA modeled with the ANN 100. Here, the ANN 10 was trained exclusively with data from a first EDFA line with 2 EDFA pumps. We tested the ANN 100 on data from a failed second EDFA card from a different network, and the ANN 100 generated an alert 8 weeks prior to the recorded circuit pack failure.

Consider a network containing three distinct EDFA types as follows:

| Other inputs | EDFA Type 1 | EDFA Type 2 | EDFA Type 3 |
|---|---|---|---|
| . . . | 1 | 0 | 0 |
| . . . | 0 | 0 | 1 |
| . . . | 0 | 1 | 0 |
| . . . | 0 | 0 | 1 |
| . . . | 1 | 0 | 0 |

We can generalize the ANN model to accommodate various amplifier types and operating conditions. The above table illustrates the "one-hot encoding" technique used to represent categorical features such as EDFA type in the input data. The ANN 100 will determine whether there is an adjustment factor it can apply to its predictions to account for the differences in EDFA hardware. In practice we would only need to add two new input features, since if the EDFA is not type 1 or type 2, it is trivially true that the EDFA must be type 3. Three columns are shown for illustration purposes.

There can be many permutations of amplifier types/settings/operating conditions. In this case, we could use parameterization to characterize the features of each amplifier. This method would use a combination of one-hot encoding for binary features and label encoding for categorical features as shown in the following table:

| Other inputs | EDFA Pump Count | C-Band vs. L-Band | Categorical features |
|---|---|---|---|
| . . . | 1 | 0 | . . . |
| . . . | 2 | 1 | . . . |
| . . . | 2 | 0 | . . . |
| . . . | 1 | 0 | . . . |
| . . . | 3 | 1 | . . . |

The categorical features can include gain range, tilt range, output power range, fiber emission coefficient, fiber absorption coefficient, etc.

Figure 12:
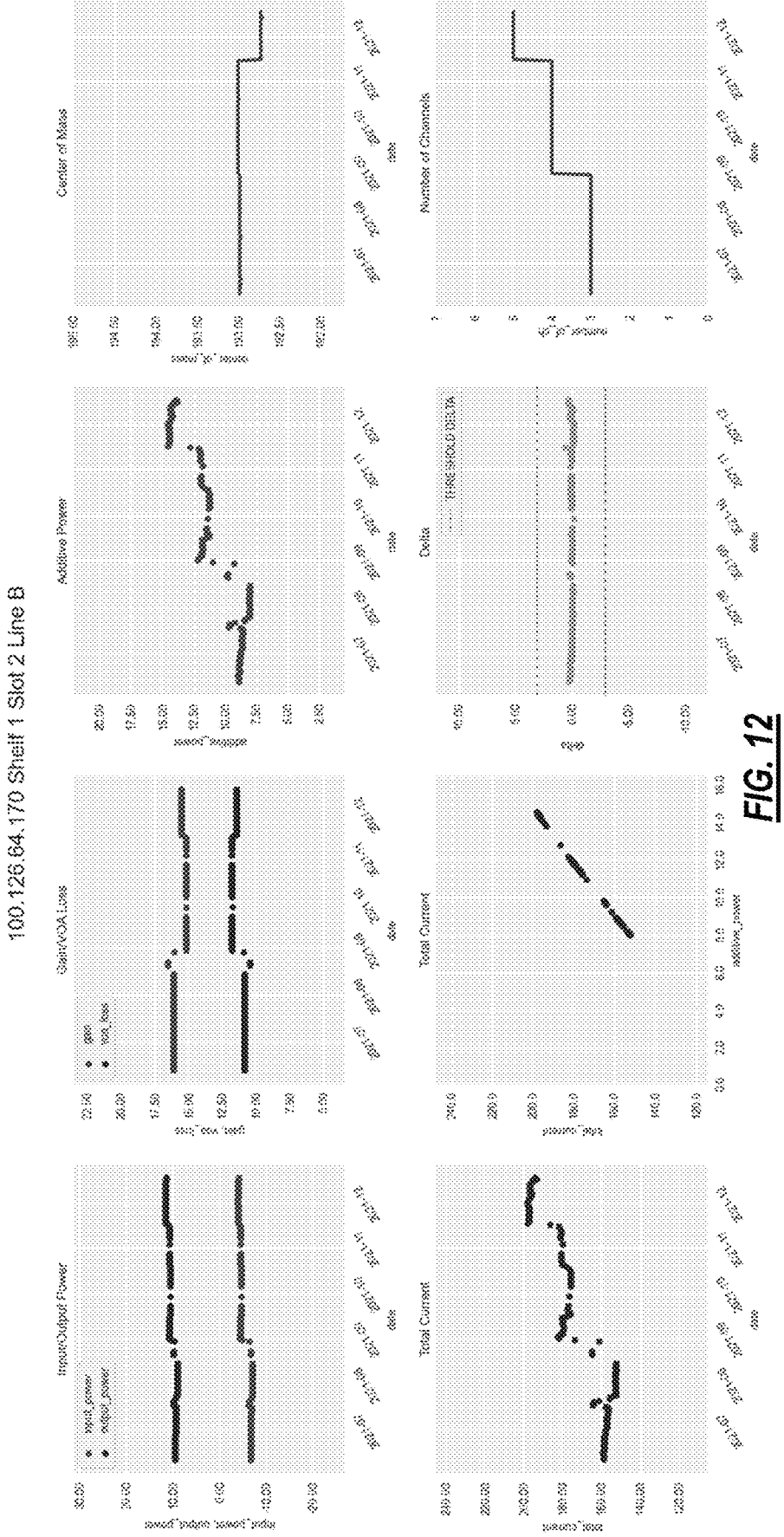
FIG. 12 is graphs where a generalized approach was modeled in an actual network on several months worth of data, and no critical alerts were generated.

FIG. 12 is graphs where this approach was modeled in an actual network on several months worth of data, and no critical alerts were generated.

Principal Component Analysis

Principal Component Analysis is a dimensionality reduction technique that transforms a dataset into uncorrelated "principal components." For our application, PCA can be used to discern which features contribute to the variance along different axes. FIG. 13 is a graph of two example components in Principal Component Analysis. Principal components are orthogonal to each other in n-dimensional space. The process for PCA involves an eigenvector problem (any symmetric matrix is orthogonally diagonalizable) using the covariance matrix of the standardized features. Each subsequent principal component is orthogonal to those previous.

If we regress the components against total current and plot the error vs. number of components used in the regression, we can determine which components account for most of the variance in total current. We will select the first two components for this analysis (shown in FIG. 13), because these contribute the most to total current.

FIG. 14 is a heatmap depicting the magnitude of the weights for each feature in the first two components in the Principal Component Analysis. Recall the components are linear combinations of the features). We can see that the strongest predictors of total current are an optical power metric and the number of channels. The variance along the principal axis is explained by changes in our optical power metric (G*Pin, additive power, output power . . . ). The variance along the secondary axis and beyond is explained by changes in other operating conditions (frequency, VOA loss . . . ).

Key takeaways:
The variance along the principal axis is explained by changes in our optical power metric (this can be G*Pin, additive power, output power etc. . . . )
The variance along the secondary axis and beyond is explained by other changes in operating conditions (frequency, VOA loss, gain tilt)

Machine Learning Process

FIG. 15 is a flowchart of a machine learning process 200 for failure prediction of optical amplifiers. The process 200 can be implemented as a method, implemented in the controller 26 of the EDFA optical amplifier 10, implemented on a server, in the cloud, in a network management system, etc., or embodied as instructions stored in a non-transitory computer-readable medium.

The process 200 includes obtaining a plurality of inputs from an optical amplifier associated with an optical network (step 201); analyzing the plurality of inputs with a trained machine learning model (step 202); obtaining an estimate of a total pump current of the optical amplifier as an output of the trained machine learning model (step 203); and comparing the estimate of a total pump current to a measured total pump current of the optical amplifier (step 204). The process 200 can further include determining a health of the optical amplifier based on the comparing. For example, the determined health can be used to raise alarms/warnings when there is degradation so that the optical amplifier can be replaced proactively.

The plurality of inputs can include any of input power, output power, an optical power metric, a gain target, a tilt setting, a Variable Optical Attenuator (VOA) loss, a center of mass, a number of channels, an efficiency metric, and total threshold currents of all pumps. The plurality of inputs can include an optical power metric and a number of channels.

The plurality of inputs can include operating parameters that are measured in operation and configuration parameters that are either configured or based on hardware type. For example, the operating parameters can be measured based on operation, e.g., center of mass, number of channels, the efficient metric, the total threshold currents of all pumps, optical power metric, the input and output power, etc. The configuration parameters are based on the type of optical amplifier hardware, e.g. gain target, tilt setting, etc.

The plurality of inputs can include an adjustment factor based on a type of hardware for the optical amplifier. The plurality of inputs can include categorical features based on a type of hardware for the optical amplifier. The trained machine learning model can be trained on historical data from one or more types of optical amplifiers, and wherein the plurality of inputs are from a different type of optical amplifier from the one or more types of optical amplifiers.

The trained machine learning model can be a deep neural network having two layers. The two layers can include a perceptron model and a rectified linear unit activation function.

Also, while the particular ANN described herein was a multi-layer perceptron model, those skilled in the art will appreciate other types of neural networks are contemplated herewith. These could include recurrent neural networks which are effective given that we are working with time series data, and also for variables that are correlated with each other. The current model operates under the assumption that the input variables are uncorrelated, which is known not to be true. Also, modular neural networks can be used for binning together different features/input variables based on their known/expected impact on the magnitude of the estimation. For example, all optical power metrics (input/output power, additive power, gain) are in one "module", since we expect these features to be positively correlated with pump current.

CONCLUSION

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium having instructions stored thereon for programming a processor to perform steps of:
    obtaining a plurality of inputs from an optical amplifier associated with an optical network;
    analyzing the plurality of inputs with a trained machine learning model;
    obtaining an estimate of a total pump current of the optical amplifier as an output of the trained machine learning model; and
    comparing the estimate of a total pump current to a measured total pump current of the optical amplifier.

2. The non-transitory computer-readable medium of claim 1, wherein the steps include
    determining a health of the optical amplifier based on the comparing.

3. The non-transitory computer-readable medium of claim 1, wherein the plurality of inputs include any of input power, output power, an optical power metric, a gain target, a tilt setting, a Variable Optical Attenuator (VOA) loss, a center of mass, a number of channels, an efficiency metric, and total threshold currents of all pumps.

4. The non-transitory computer-readable medium of claim 1, wherein the plurality of inputs include an optical power metric and a number of channels.

5. The non-transitory computer-readable medium of claim 1, wherein the plurality of inputs include operating parameters that are measured in operation and configuration parameters that are either configured or based on hardware characteristics of the optical amplifier, including at least one of a pump count, a supported wavelength band, a gain range, or a tilt range.

6. The non-transitory computer-readable medium of claim 1, wherein the trained machine learning model includes an adjustment factor based on hardware characteristics of the optical amplifier, including at least one of a pump count, a supported wavelength band, a gain range, or a tilt range.

7. The non-transitory computer-readable medium of claim 1, wherein the plurality of inputs include categorical features representing hardware characteristics of the optical amplifier, including at least one of a pump count, a supported wavelength band, a gain range, or a tilt range.

8. The non-transitory computer-readable medium of claim 1, wherein the trained machine learning model is trained on historical data from optical amplifiers having particular hardware characteristics, and wherein the plurality of inputs are from an optical amplifier having different hardware characteristics, including at least one of a different pump count, a different supported wavelength band, a different gain range, or a different tilt range.

9. The non-transitory computer-readable medium of claim 1, wherein the trained machine learning model is a deep neural network having two layers.

10. The non-transitory computer-readable medium of claim 9, wherein the two layers include a multi-layer perceptron model and a rectified linear unit activation function at each node in the multi-layer perceptron model.

11. A method comprising steps of:
    obtaining a plurality of inputs from an optical amplifier associated with an optical network;
    analyzing the plurality of inputs with a trained machine learning model;
    obtaining an estimate of a total pump current of the optical amplifier as an output of the trained machine learning model; and
    comparing the estimate of a total pump current to a measured total pump current of the optical amplifier.

12. The method of claim 11, wherein the steps include determining a health of the optical amplifier based on the comparing.

13. The method of claim 11, wherein the plurality of inputs include any of input power, output power, an optical power metric, a gain target, a tilt setting, a Variable Optical Attenuator (VOA) loss, a center of mass, a number of channels, an efficiency metric, and total threshold currents of all pumps.

14. The method of claim 11, wherein the plurality of inputs include an optical power metric and a number of channels.

15. The method of claim 11, wherein the plurality of inputs include operating parameters that are measured in operation and configuration parameters that are either configured or based on hardware characteristics of the optical amplifier, including at least one of a pump count, a supported wavelength band, a gain range, or a tilt range.

16. The method of claim 11, wherein the trained machine learning model includes an adjustment factor based on hardware characteristics of the optical amplifier, including at least one of a pump count, a supported wavelength band, a gain range, or a tilt range.

17. The method of claim 11, wherein the plurality of inputs include categorical features based on hardware characteristics of the optical amplifier, including at least one of a pump count, a supported wavelength band, a gain range, or a tilt range.

18. The method of claim 11, wherein the trained machine learning model is trained on historical data from optical amplifiers having particular hardware characteristics, and where the plurality of inputs are from an optical amplifier having different hardware characteristics, including at least one of a different pump count, a different supported wavelength band, a different gain range, or a different tilt range.

19. The method of claim 11, wherein the trained machine learning model is a deep neural network having two layers.

20. The method of claim 19, wherein the two layers include a multi-layer perceptron model and a rectified linear unit activation function at each node in the multi-layer perceptron model.

* * * * *